United States Patent
Gonzalez-Espin et al.

(10) Patent No.: US 10,050,549 B2
(45) Date of Patent: Aug. 14, 2018

(54) POWER CONVERTER UNIT INCLUDING A RECTIFIER AND AN ACTIVE POWER FILTER

(71) Applicant: Goodrich Control Systems, West Midlands (GB)

(72) Inventors: Francisco Gonzalez-Espin, Madrid (ES); Thomas Gietzold, Stratford upon Avon (GB)

(73) Assignee: GOODRICH CONTROL SYSTEMS, Solihull, West Midlands (GB)

( * ) Notice: Subject to any disclaimer, the term of this patent is extended or adjusted under 35 U.S.C. 154(b) by 0 days.

(21) Appl. No.: 15/421,766

(22) Filed: Feb. 1, 2017

(65) Prior Publication Data

US 2017/0222571 A1    Aug. 3, 2017

(30) Foreign Application Priority Data

Feb. 1, 2016  (EP) ..................... 16153595

(51) Int. Cl.
| | | |
|---|---|---|
| *H02M 7/00* | (2006.01) | |
| *H02M 7/06* | (2006.01) | |
| *H02M 1/12* | (2006.01) | |
| *H02M 1/08* | (2006.01) | |
| *H02M 1/00* | (2006.01) | |

(52) U.S. Cl.
CPC ............... *H02M 7/06* (2013.01); *H02M 1/08* (2013.01); *H02M 1/12* (2013.01); *H02M 2001/0009* (2013.01)

(58) Field of Classification Search
None
See application file for complete search history.

(56) References Cited

U.S. PATENT DOCUMENTS

| | | | |
|---|---|---|---|
| 9,584,039 B2* | 2/2017 | Nguyen | ................. H02M 7/06 |
| 2014/0184315 A1* | 7/2014 | Wallace | ................. H02M 1/126 327/532 |

OTHER PUBLICATIONS

An adaptive synchronous-Reference-Frame Phase-Locked-Loop for Power Quality Improvement in a Polluted Utility Grid. F. Gonzalez-Espin, E. Figueres, and G. Garcera, IEEE Transactions on Industrial Electronics, vol. 59, pp. 2718-2731, 2012.

(Continued)

*Primary Examiner* — Adolf Berhane
*Assistant Examiner* — Henry Lee, III
(74) *Attorney, Agent, or Firm* — Cantor Colburn LLP

(57) ABSTRACT

A power converter unit comprising a rectifier arranged to receive AC input from a variable or fixed frequency AC power source and an active power filter with an adaptive control algorithm connected as a shunt between the AC input and the rectifier.

10 Claims, 8 Drawing Sheets

(56) References Cited

OTHER PUBLICATIONS

Extended European Search Report, partial European Search Report/ Declaration of No Search, and European Search Opinion of European Patent Application No. 16153595.0, dated Jul. 13, 2016, 7 pages.
Hogan Diarmaid J. et al., "Adaptive Resonant Current-Control for Active Power Filtering within a Microgrid", 2014 IEEE Energy Conversion Congress and Exposition (ECCE), IEEE, Sep. 14, 2014, pp. 3468-3475, (retrieved on Nov. 11, 2014).
Multipulse AC-DC Converters for Improving Power Quality: A Review, B. Singh, S. Gairola, B.N. Singh, A. Chandra; K. Al-Haddad. IEEE Transactions on Power Electronics, vol. 23, No. 1, Jan. 2008, pp. 260 ff.
Polyphase Transformer Arrangements with Reduced kVA Capacities for Harmonic Current Reduction in Rectifier-Type Utility Interface, S. Choi, P.N. Enjeti and I.J. Pitel. IEEE Transactions on Power Electronics, vol. 11, pp. 680-690, 1996.

* cited by examiner

POWER CONVERTER UNIT INCLUDING A RECTIFIER AND AN ACTIVE POWER FILTER

FOREIGN PRIORITY

This application claims priority to European Patent Application No. 16153595.0 filed Feb. 1, 2016, the entire contents of which is incorporated herein by reference.

TECHNICAL FIELD

The present disclosure is related generally to aircraft electrical power systems and more specifically to a rectifier unit for an AC to DC power converter.

BACKGROUND

In aircraft, there is now a move to greater use of electrical power and electronic systems rather than hydraulic and pneumatic systems as this has the potential of leading to lighter aircraft. This trend to more electric aircraft (MEA) means that modern aircraft include large generators that generate more electrical power during flight than today and this generated power is used to supply power to more and different on-board aircraft electric power systems. The generators use rotation of the engine to generate AC power using known techniques. The electric frequency on more recent aircrafts may range from 350-800 Hz, while the AC voltage is usually regulated at a fixed value such as 115 Vac or 230 Vac. While the aircraft engines are not running, the on-board electric systems are generally powered by ac power from a ground cart. Such power is typically 115V/230V 400 Hz AC power.

While aircraft electrical power is generated in the form of three-phase alternating current, most electrical loads require DC power to operate, and so conversion of AC to DC power is required. The direct rectification of 3-phase AC power into DC power is simple and straightforward, e.g. using 3 pairs of diodes, however this creates unacceptable levels of current distortion or harmonics. These distortions cause power quality issues which are difficult to address, especially since, in modern aircraft, the fundamental frequency may vary over a wide range. Regulating bodies have imposed stringent power quality requirements including limitations on harmonic currents that can be drawn from an aircraft ac power system.

Multipulse power conversion is one of several technologies capable of AC-DC power conversion with low distortion levels that meet aerospace power quality standards.

A typical autotransformer-based multipulse converter contains two major functional blocks—a multipulse autotransformer and a rectifier. Autotransformer rectifier units (ATRU) have a low part count and are highly reliable. They have only few low frequency switching components, so EMI emissions are low. However the ATRU adds considerable weight and cost to an aircraft system equipped that way.

A multiphase converter performs a phase shifting process through transformers to convert from an original three-phase ac supply to multiphase ac supply to result in a higher number of pulses in dc output to result in a close to sinusoidal current draw with reduced harmonic distortion at the ATRU input.

An n-pulse ATRU is composed of n/6 6-pulse diode bridges (n/2 diode pairs) and uses phase-shifting of the secondary voltages in the autotransformer. A three phase fixed or variable frequency—constant amplitude voltage source supplies power to the ATRU, thus providing three different phase shifted sinusoidal 3 phase voltages ATRUs used in aircraft are typically 18-pulse converters, but others, e.g. 12-pulse, 24-pulse, etc. may be used. A 12-pulse ATRU, for example, is described in "Polyphase Transformer Arrangements with Reduced kVA Capacities for Harmonic Current Reduction in Rectifier-Type Utility Interface", S. Choi, P. N. Enjeti and I. J. Pitel. IEEE Transactions on Power Electronics, vol. 11, pp 680-690, 1996. An overview of multipulse AC-DC converters can be found in "Multipulse AC-DC Converters for Improving Power Quality: A Review", B. Singh, S. Gairola, B. N. Singh, A. Chandra; K. Al-Haddad. IEEE Transactions on Power Electronics, vol. 23, No. 1, January 2008, pp. 260 ff.

FIG. 1 shows a block diagram of a typical 18-pulse rectifier unit including the Autotransformer Rectifier Unit (ATRU), diode bridges and Interphase Transformers (IPTs). This shows the ATRU 1 comprising an isolated or non-isolated multi-winding transformer that displaces the AC input voltage a number of degrees dependent on the number of secondary windings.

The output voltage of the multi-phase winding is rectified by a number of basic 6-pulse rectifier cells 2, thus improving the input current total harmonic distortion. The input current quality, however, is limited by the number of 6-pulse stages. If additional 6-pulse cells are added to achieve a lower distortion, this results in an undesirable increase in the weight of the rectifier unit.

The aim of the present disclosure is to provide a power converter that mitigates harmonic distortion and adds redundancy to the rectification stage with either fixed frequency or variable frequency AC power source, while avoiding the use of the autotransformer unit and the IPT, thus reducing the rectifier unit weight compared with the existing ATRU solution.

SUMMARY

According to the disclosure there is provided an AC-DC converter unit comprising a rectifier to receive AC input from an AC power source and an active power filter (APF) connected as a shunt between the AC input and the rectifier.

The AC power source can be fixed or variable frequency.

The rectifier is preferably a single, 6-pulse rectifier cell.

The rectifier provides a DC output. The converter unit may further comprise a filter connected to the rectifier DC output to smooth the DC output.

The APF is controlled by an adaptive algorithm to reduce or eliminate fixed or variable frequency harmonics drawn by the rectifier, thus avoiding the need for an ATRU.

The rectifier unit can be operated in a degraded mode if the APF does not perform as expected, thus adding redundancy to the rectifier unit.

BRIEF DESCRIPTION OF THE DRAWINGS

Preferred embodiments will now be described, by way of example only, with reference to the drawings.

DETAILED DESCRIPTION

Figure 1:
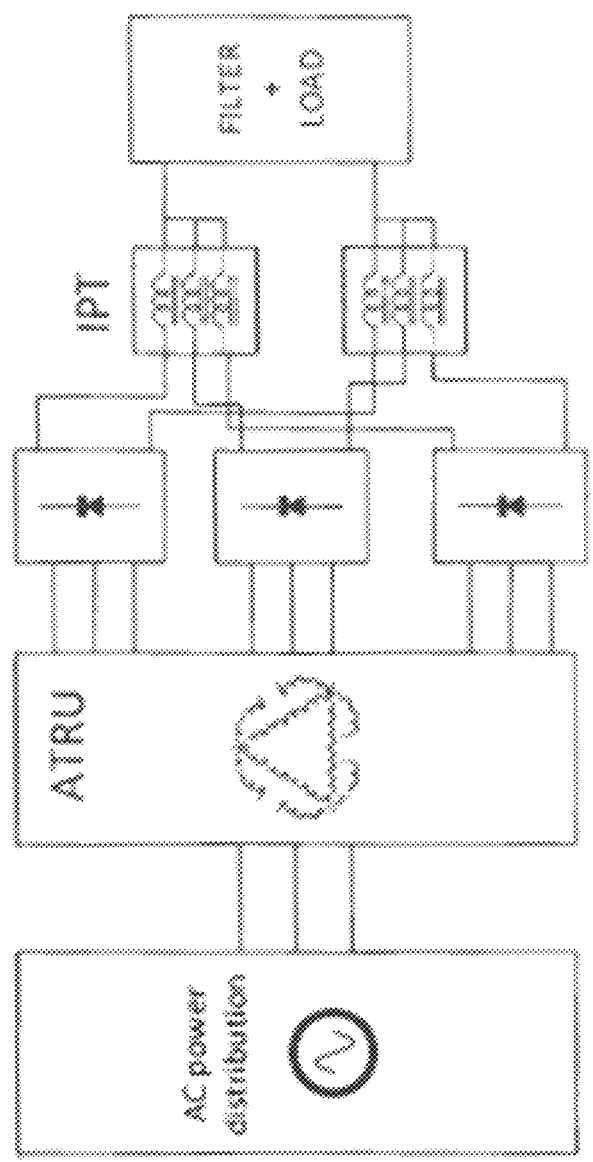
FIG. 1 is a block diagram of a typical multipulse rectifier system using an ATRU to reduce harmonic distortions.

The conventional rectifier unit has been described above in the Background section with reference to FIG. 1.

In contrast, in the present disclosure, the ATRU and the use of n/6 6-pulse diode bridges (where n is an integer) is substituted by a single 6-pulse rectifier cell connected directly to the AC power distribution system (which can be fixed or variable frequency) and an active power filter (APF) connected in parallel to the rectifier cell, as a shunt APF.

The shunt APF is designed to locally compensate for the non-linear current harmonics, thus allowing the harmonics content of the current drawn by the power distribution system to be below the permitted maximum.

The shunt APF control includes an adaptive control algorithm able to assure proper current harmonics compensation within a predefined frequency variation range, typically 350-800 Hz.

The active filter is arranged to modify the amplitude and/or phase characteristics of the current provided by the AC power signal so as to compensate for harmonic currents drawn by the load.

Figure 2:
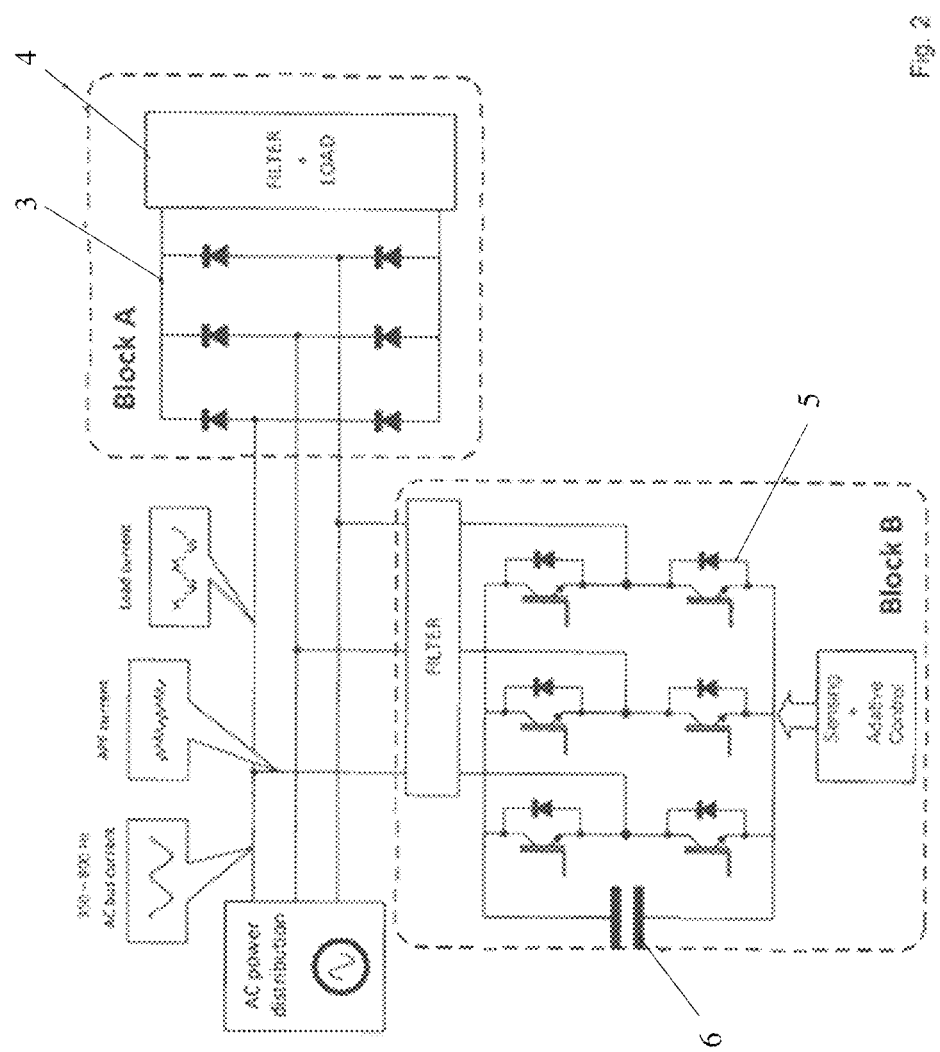
FIG. 2 is a block diagram of a rectifier unit according to this disclosure.

The proposed power converter unit is shown in FIG. 2, where block A and block B represent the main parts of the unit. Both block A and block B are connected to the AC power distribution system. Block A is a rectifier composed of a 3-phase diode bridge 3, a filter 4 and the load. The current drawn by the block A contains harmonics from the fundamental AC power distribution frequency that need to be filtered out to meet power quality requirements. As discussed above, the current solution is to use an ATRU to eliminate or minimise harmonics. The present disclosure presents an alternative solution. In order to achieve the aforementioned power quality requirements, a shunt active power filter or APF depicted in block B is proposed in this disclosure. The APF is composed by at least six semiconductors 5 operated in switching mode and a storage element 6, which could be a capacitor. The APF is controlled so that it locally injects the harmonics other than the fundamental frequency drawn by the block A, so that a cancelling-out effect occurs and the current provided by the AC power distribution contains only the fundamental frequency. The APF shown in block B includes an adaptive control algorithm which is able to compensate the undesired harmonics drawn by block A no matter what the variation in the frequency of the AC power distribution main harmonic is, which typically varies from 350-800 Hz in a variable frequency AC power supply system.

Figure 3:
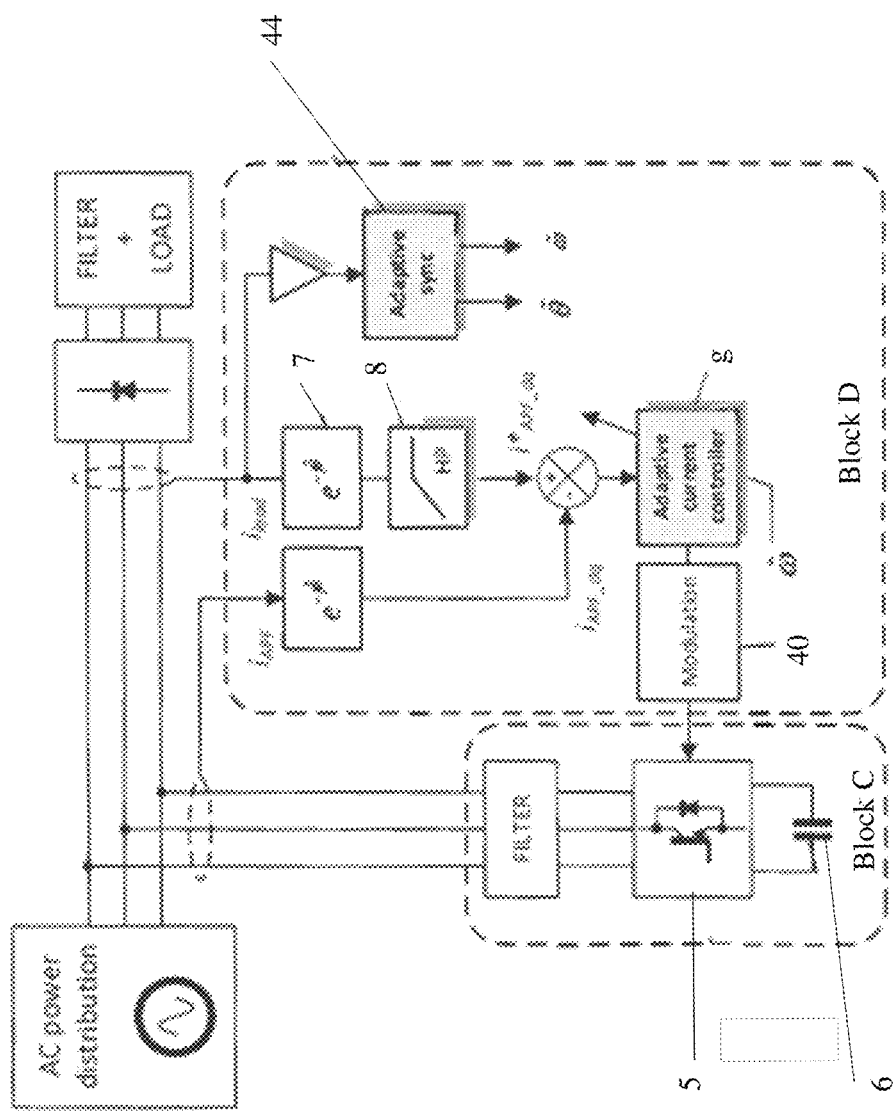
FIG. 3 is a block diagram showing the APF in more detail.

The preferred shunt active power filter is shown in more detail in FIG. 3. Block C represents the power stage comprising the semiconductors 5 and storage element 6 explained in the previous section, while block D represents the control architecture of the control algorithm to achieve the harmonics compensation regardless of frequency variations of the AC power distribution system.

The preferred control algorithm is composed by:

A transformation stage, $e^{-j\theta}$, 7 which rotates the sensed currents from the natural reference frame to the synchronous reference frame.

A high pass filter, HP, 8 which rejects the fundamental harmonic information from the sensed load current. The output of the HP block is used as the reference for the current to be injected by the shunt APF.

An Adaptive current controller 9, which is responsible for offering a high control loop gain at the frequency of the harmonics to be injected by the shunt APF, regardless the AC power system main frequency A Modulation block 10, which is typically deployed through pulse width modulation PWM or space vector modulation SVM modulation techniques, and that may include a transformation stage as well, An Adaptive grid synchronization algorithm 11 which extracts AC power distribution voltage frequency and phase angle information.

The adaptive features of block D are provided by the adaptive grid synchronization algorithm 11 and the adaptive current controller 9 as described further below.

Adaptive Grid Synchronization Algorithm

The adaptive grid synchronization algorithm 11 is responsible for synchronising the shunt APF with the AC power distribution system. This algorithm is based on the standard Synchronous Reference Frame Phase Locked Loop (SRF-PLL) and adds adaptive filtering features to cope with the lack of synchronization accuracy that occurs when the AC power distribution voltage is polluted with voltage harmonics and its frequency is not fixed.

Figure 4:
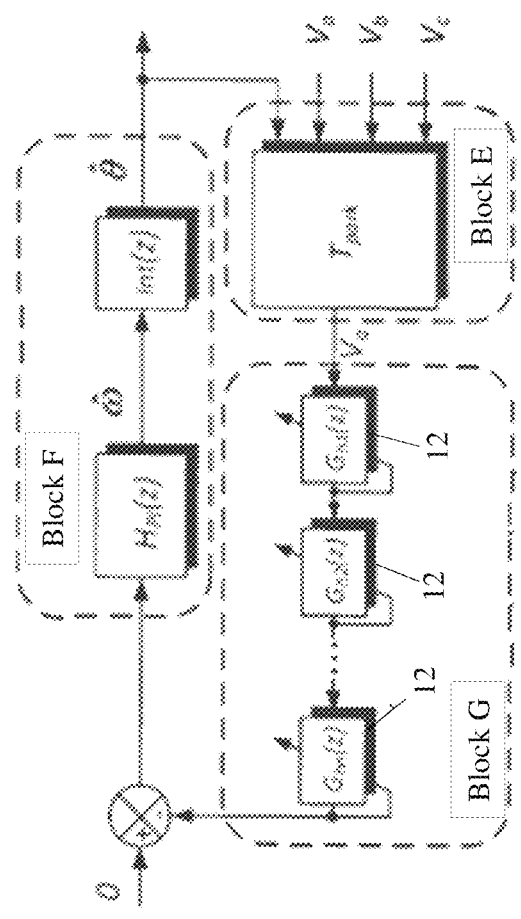
FIG. 4 shows an adaptive lattice SRF-PLL.

The preferred adaptive grid synchronization algorithm proposed in this disclosure is called Adaptive Lattice Synchronous Reference Frame Phase Locked Loop (ALSRF-PLL) and is shown in FIG. 4. The ALSRF-PLL has been described in "An adaptive synchronous-Reference-Frame Phase-Locked-Loop for Power Quality Improvement in a Polluted Utility Grid." F. Gonzalez-Espin, E. Figueres, and G. Garcera, IEEE Transactions on Industrial Electronics, vol. 59, pp. 2718-2731, 2012, and is composed of three main blocks:

Block E represents the Park transformation, and is responsible for rotating the AC voltage vector from the natural reference frame to the synchronous reference frame.

Block F includes the regulator $H_{Pf}(z)$, which is usually a Proportional+Integral controller, and the block Int(z), which is an integrator. The output of those blocks are the AC voltage frequency, $\bar{\omega}$, and phase angle, $\hat{\theta}$, respectively.

Block G adds the adaptive feature to the ALSRF-PLL and is composed of n adaptive narrow band-stop (notch) filters, $G_{hn}(z)$, that reject the undesired variable frequency harmonic content from the sensed AC voltage, thus assuring an accurate estimate of voltage frequency and phase angle.

Figure 5:
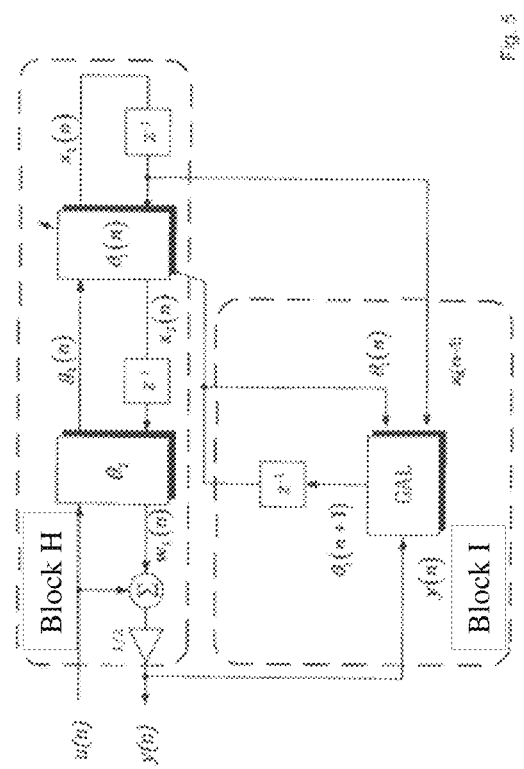
FIG. 5 shows an adaptive band-stop lattice filter.
Figure 6:
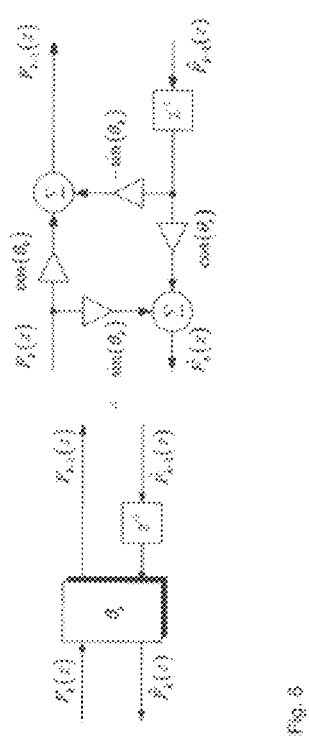
FIG. 6 shows Schur recursion.
Figure 7:
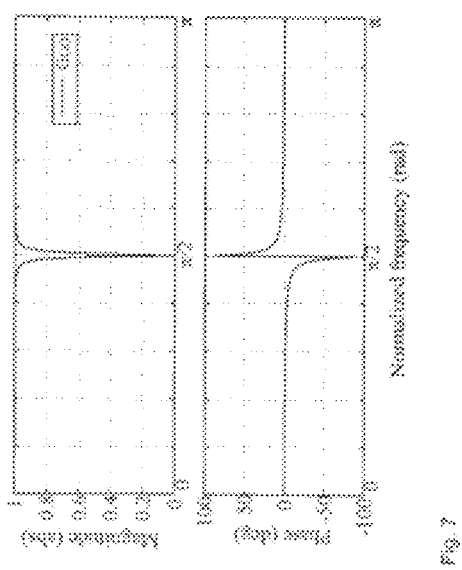
FIG. 7 shows the frequency response of the Schur Lattice notch filter.

The adaptive notch filters 12 are preferably implemented by using the Schur-lattice IIR structure shown in FIG. 5, which carries out the rotation over the transfer function involving the filtering process shown in FIG. 6. The transfer function of the notch filter is shown in equation (1), and can be derived from Block H, where the normalized center frequency, $\omega_0$, and the bandwidth, BW, can be adjusted by equation (2) and (3), respectively. The Bode plot of $G(z)$ is depicted in FIG. 7 for $\theta_1=0$ rad and $\theta_2=1.414$ rad.

$$G(z) = \frac{1}{2} \cdot \frac{(1+\sin(\theta_2))(1+2\sin(\theta_1)z^{-1}+z^{-2})}{1+\sin(\theta_1)(1+\sin(\theta_2))z^{-1}+\sin(\theta_2)z^{-2}} \quad (1)$$

-continued $$\omega_0 = \theta_1 + \frac{\pi}{2}, \ |\theta_1| < \frac{\pi}{n} \quad (2)$$

$$BW = -2\tan^{-1}\left(\frac{\sin(\theta_2) - 1}{\sin(\theta_2) + 1}\right) \quad (3)$$

The main advantages of using the Schur-lattice IIR structure are as follows:
i. The structure is inherently limited to realize stable and causal filters. This makes it very appealing to use adaptive algorithms to adjust its center frequency in real time.
ii. As will be explained below, a band-stop as well as a band-pass filter can be obtained by using the same topology.
iii. All the internal nodes are inherently scaled in the Euclidean norm. In this regard, the precision can be kept constant during the filtering process.
iv. The mapping of the poles and zeros is more precise regardless of the position of the poles and zeros, because the round-off noise accumulation in the state vector loop is inherently low.
v. Quantization limit cycles can be easily suppressed.

The Gradient Adaptive Lattice (GAL) recursive algorithm can be used to automatically adjust in real-time the parameter $\theta_1$, so that the center frequency of the filters are able to filter out the undesired variable frequency harmonics. An important feature of the Schur Lattice filter with GAL recursive algorithm is that the filter does not need a reference to adaptively tune its center frequency, which is of great importance when filtering out the ALSRF-PLL harmonics. Block I in FIG. 5 implements the GAL algorithms expressed in equation (4), where μ is the adaptation gain.

$$\theta_1(n+1) = \theta_1(n) - \mu y(n) x_1(n-1) \quad (4)$$

Table I shows the implementation of the Schur Lattice IIR Notch Filter with GAL adaptation algorithm.

TABLE I

GAL ALGORITHM APPLIED TO THE SCHUR-LATTICE IIR NOTCH FILTER

Filter Parameters Computing $$\begin{bmatrix} g_1(n) \\ w_1(n) \end{bmatrix} = \begin{bmatrix} \cos(\theta_2) & -\sin(\theta_2) \\ \sin(\theta_2) & \cos(\theta_2) \end{bmatrix} \begin{bmatrix} u(n) \\ x_2(n-1) \end{bmatrix}$$

$$\begin{bmatrix} x_1(n) \\ x_2(n) \end{bmatrix} = \begin{bmatrix} \cos(\theta_1(n)) & -\sin(\theta_1(n)) \\ \sin(\theta_1(n)) & \cos(\theta_1(n)) \end{bmatrix} \begin{bmatrix} g_1(n) \\ x_1(n-1) \end{bmatrix}$$

$$y(n) = \frac{1}{2}[u(n) + w_1(n)]$$

Filter Parameters Adaptation $$\theta_1(n+1) = \theta_1(n) - \mu y(n) x_1(n-1)$$

Adaptive Current Controller

Figure 8:
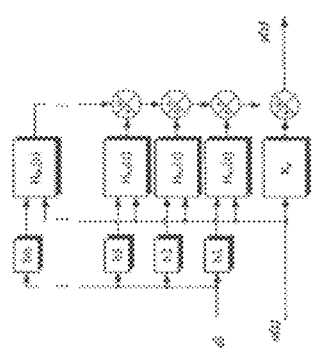
FIG. 8 shows an adaptive shunt APF current controller.

The adaptive current controller is preferably based on the control architecture shown in FIG. 8. The Proportional+Lattice controller is composed of a gain, $K_P$, in parallel with harmonic compensators, $H_{hn}(z)$. The harmonic compensators are band-pass filters tuned at the corresponding harmonics (h1 to hn in the figure). The band-pass filters offer a high gain in the control loop, so the shunt APF is able to accurately compensate for the harmonics drawn by the non-linear load. The information about the frequency of the AC voltage estimated by the Adaptive grid synchronization algorithm 11 (ALSRF-PLL) is used to adjust in real time the band-pass filter center frequency, so that the tracking of the harmonics is accurate through all of the frequency range of operation, typically 350-800 Hz.

Figure 9:
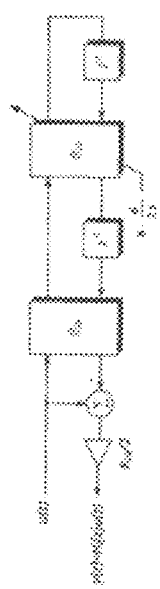
FIG. 9 shows an adaptive band-pass lattice filter.

Schur Lattice IIR band-pass Filter structure shown in FIG. 9 is preferably used in this disclosure and allows implementing an inherently stable IIR filter, which is of paramount importance when adjusting coefficients in real-time, so that the stability of the closed loop APF current control is not compromised by the coefficient adaptation process.

The transfer function of the Proportional+Lattice controller is depicted in equation (5), where (2) and (3) applies.

$$H_{PL}(z) = K_P + \sum_{h=1}^{n} \frac{K_{Lh}}{2} \cdot \frac{(1 - \sin(\theta_{2h}))(1 - z^{-2})}{1 + \sin(\theta_{1h})(1 + \sin(\theta_{2h}))z^{-1} + \sin(\theta_{2h})z^{-2}} \quad (5)$$

Figure 10:
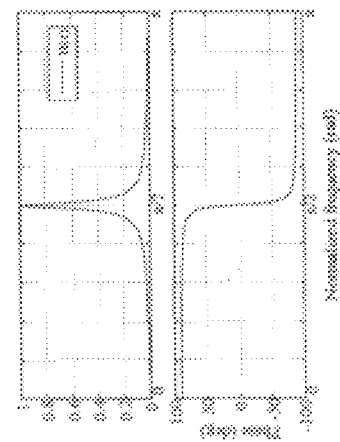
FIG. 10 shows the frequency response of the Schur Lattice band-pass filter.

The Bode plot of $H_{PL}(z)$ is depicted in FIG. 10 for $\theta_1 = 0$ rad, $\theta_2 = 1.414$ rad and $K_L = 1$ The system of this disclosure, by doing away with the ATRU, reduces the weight of the rectifier unit. Further, the shunt APF is digitally controlled and can use high frequency pulse with modulation (PWM) or other switching modulation techniques and an adaptive control algorithm, which allows very accurate fixed or variable frequency harmonics compensation. This significantly decreases weight and size of the rectifier unit compared to known multipulse rectifiers while obtaining comparable or better power quality of the current injected by the electric power system, regardless of frequency variations. The provision of the shunt APF in parallel with the rectifier also provides redundancy—i.e. if the APF fails, the rectifier will continue to operate, albeit in a degraded mode, so that the load will still receive power even though the current provided by the AC power system will be of a lower quality with more harmonic distortion.

The invention claimed is:
1. A power converter unit comprising:
a rectifier arranged to receive AC input from an AC power source;
an active power filter connected as a shunt between the AC input and the rectifier, wherein the active power filter comprises a control algorithm to cause removal of current harmonic frequencies from the AC input but not of the current fundamental frequency of the AC input;
means for transforming sensed AC input currents to a synchronous reference frame;
means for filtering out a fundamental harmonic from a sensed load current and providing only harmonics of the fundamental at an output;
adaptive current control means for providing a high control loop gain at the frequency of the harmonics from the output of the means for filtering regardless of AC power source fundamental frequency; and
means for modulating the output of the adaptive current control means.
2. The power converter unit of claim 1 where the rectifier is arranged to receive AC input from a fixed or variable frequency AC power source.
3. The power converter unit of claim 1, wherein the rectifier comprises a 3-phase diode bridge.
4. The power converter unit of claim 1, wherein the active power filter comprises a plurality of semiconductor switches and a storage element.

5. The power converter unit of claim 1, wherein the adaptive current control includes adaptive band-pass filters implemented using a Schur-Lattice LLR structure.

6. The power converter unit of claim 1, wherein the control algorithm further comprises means for synchronising the active power filter with the AC power source.

7. The power converter unit of claim 6, wherein the means for synchronising is an algorithm using Adaptive Lattice Synchronous Reference Frame Phase Locked Loop (ALSRF-PLL) synchronisation.

8. The power converter unit of claim 7, wherein the algorithm comprises
- means for transforming an AC voltage vector of the AC input to a synchronous reference phase;
- a regulator and an integrator connected in series to provide an input to the means for transforming;
- a plurality of adaptive band-stop filters arranged to reject undesired variable frequency harmonic content from the sensed AC input voltage, regardless of AC power source fundamental frequency.

9. The power converter unit of claim 8, wherein the band-stop filters are implemented using a Schur-Lattice IIR structure.

10. The power converter unit of claim 9, wherein the band-stop filters centre frequencies are adapted in real-time to track AC power source frequency variations using a Gradient Lattice Algorithm.

\* \* \* \* \*